Nov. 8, 1966       J. LAMONT       3,284,704
METHOD FOR DETERMINING THE MAGNITUDE OF AN OPEN FAULT IN ONE
OF A PAIR OF CURRENT CARRYING CONDUCTORS BY MEASURING
THE VOLTAGE ACROSS A CAPACITANCE IN SERIES
WITH THE CAPACITANCE OF SAID PAIR

Filed April 10, 1962

INVENTOR
J. LAMONT

By A. J. Nugent
ATTORNEY

INVENTOR
J. LAMONT
By A. J. Nugent
ATTORNEY

United States Patent Office 3,284,704
Patented Nov. 8, 1966

3,284,704
METHOD FOR DETERMINING THE MAGNITUDE OF AN OPEN FAULT IN ONE OF A PAIR OF CURRENT CARRYING CONDUCTORS BY MEASURING THE VOLTAGE ACROSS A CAPACITANCE IN SERIES WITH THE CAPACITANCE OF SAID PAIR
John Lamont, North Arlington, N.J., assignor to Western Electric Company, Incorporated, New York, N.Y., a corporation of New York
Filed Apr. 10, 1962, Ser. No. 186,501
2 Claims. (Cl. 324—52)

This invention relates to measuring devices and particularly to a method of, and apparatus for locating faults in multi-conductor cable.

In the manufacture of multi-conductor cable, locating faults is one of the most vexing problems encountered. This is especially true in the telephone industry where over a hundred billion conductor feet of cable are manufactured each year. Of this amount, a certain proportion must be scraped due to inaccurate location of faults. Moreover, the inaccurate locating of faults results in increased test and repair time which results in an additional loss of money.

Most, if not all, cable fault locating arrangements in use today utilize some form of a Wheatstone bridge in order to determine the distance to a fault. These arrangements have proven to be costly and difficult to operate, especially where high accuracies are desired. Further, their use acquires an inherent inaccuracy in that the accuracy of the reading depends to a great extent on the skill and refinement of observation of the operator in obtaining precise readings.

While it is true that some arrangements have been found to be adequate where the length of the individual cable is small, where the length of the individual cable is large, as in the telephone industry where the length of individual cables can be as much as four miles long, most prior methods and apparatus have proven to be inadequate. This is mainly due to the resolution of the readout or scale associated with the bridge.

For example, in U.S. Patent 754,402 of March 8, 1904, to Daniel E. Wiseman, a Wheatstone bridge is utilized, the variable portion thereof being calibrated in units of feet, thereby enabling direct readout of the fault location. This equipment, which is still in use today, is adequate and accurate, provided the scale associated therewith permits of easy and accurate readout. However, where the cable to be tested is large, e.g., four miles long, it is readily seen that the scale reading required may extend over thousands of units. Obviously to construct such a scale is infeasible and prohibitively costly, and the use thereof would be extremely cumbersome.

An attempt to solve this problem was made in U.S. Patent 2,120,391 of June 14, 1938, to Butterfield. The apparatus disclosed therein includes a Wheatstone bridge arrangement wherein the variable resistance portion thereof comprises cascaded decade resistances and a resistance continuously variable over a range of ten units. Although this equipment can provide fairly accurate measurement of faults located in large cables, the equipment required is complex, costly and laborious to operate. Moreover, this equipment, as well as its predecessor and all other Wheatstone bridge devices, has another great disadvantage, namely, the inability to detect and locate more than one fault, especially those of the short circuit type, between conductors. While there is equipment available that can detect and locate more than one fault, these are not direct reading and require calculations on the part of the operator to locate the position of the fault. Manifestly, the use of such equipment is time consuming; moreover, there would always be the possibility of inaccurate location due to errors in calculation.

It is, therefore, an object of this invention to provide a method of, and apparatus for the location of faults in cable which is direct reading, accurate and simple and convenient to use.

In accordance with the general features of this invention, a voltage is applied to a first conductor in a cable, the magnitude thereof being decimally related to the length of the cable. The voltage from one end of the first conductor to one opposite end of a second conductor in the cable is then measured, the fault being located between the first and second conductors. The voltage reading obtained gives the location to the fault directly in units of length.

In a preferred embodiment of the invention, a digital voltmeter is used for measurements. Such devices are extremely accurate and easy to use. Also, because of the nature of the readout, the accuracy of the reading does not depend on the skill or lack of skill of the operator performing the testing.

One aspect of this invention is the ability to detect and locate one or more faults of the short circuit type. This is done by applying a voltage decimally related to the cable length to a first conductor in the cable and measuring the current therethrough. Since the gage of the conductor is known, the current that should flow through the conductor with a voltage applied thereto as above can be easily determined. If more than one short exists between the first conductor and a second conductor in the cable, the resistance of the first conductor will be less than if no shorts or one short existed. This will show up as an increased current reading. To determine the location of the shorts, the applied voltage is varied until a current reading equal to the no-short or one-short is obtained. A voltage reading from one end of the first conductor to one adjacent end of the second conductor will then indicate the location of the first short directly in units of length, and a second voltage reading from the other end of the first conductor to the other end of the second conductor will indicate the location of the second short directly in units of length.

The invention will be more readily understood from the detailed description which follows when read in conjunction with the drawings, wherein.

Figure 1:
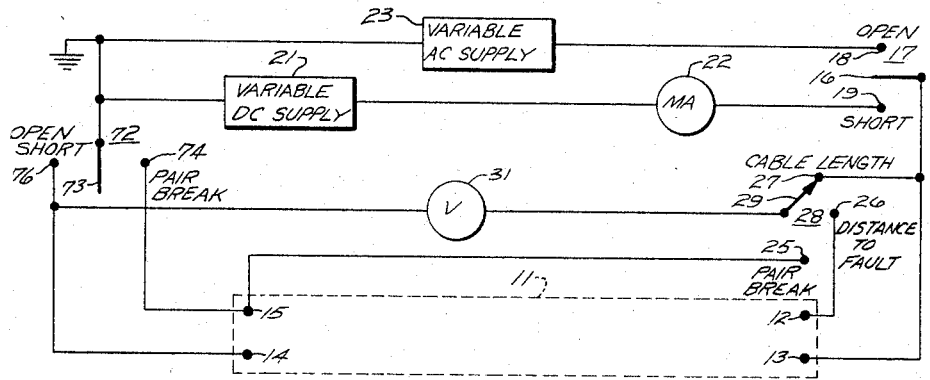
FIG. 1 is a schematic of an embodiment of the invention.

Referring now to the drawings and particularly to FIG. 1, the circuit shown therein includes a test fixture 11 having terminals 12, 13, 14 and 15 for receipt therein of the conductors of a multi-conductor cable. Terminal 13 is connected to the arm 16 of switch 17. Connected to contact 19 of switch 17 is a source of variable D.C. voltage 21 and a D.C. milliameter 22, and connected to contact 18 of switch 17 is a source of variable A.C. voltage 23. The contacts 25, 26 and 27 of switch 28 are connected to terminals 15, 12 and 13 of test fixture 11, respectively, and the arm 29 of switch 28 is connected to a voltmeter 31 which is adaptable for both A.C. and D.C. measurements by suitable means not shown. The other end of voltmeter 31 and terminal 14 are connected to contact 76 of switch 72. Contact 74 of switch 72 is connected to terminal 15 and the arm 73 of switch 72 is common or ground.

Although switches have been shown, it should be apparent to one skilled in the art that this is merely illustrative, and that relays or other types of switching devices can be employed instead.

Figure 2:
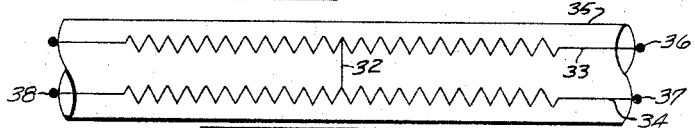
FIG. 2 is an equivalent circuit of a pair of conductors having a short circuit therebetween.
Figure 3:
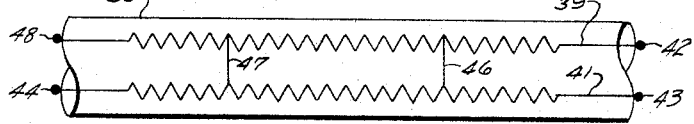
FIG. 3 is an equivalent circuit of a pair of conductors having two short circuits therebetween.

FIG. 2 shows the equivalent circuit of a multiconductor cable 35 having a short circuit 32 between a pair of conductors 33 and 34. In order to determine the location of the short 32, end 36 of conductor 33 is connected to terminal 12 of test fixture 11 and ends 37 and 38 of conductor 34 are connected to terminals 13 and 14, respectively. Thus, when switch 72 is thrown to its OPEN-SHORT position, and when switch 17 is thrown to its SHORT position, a D.C. voltage is applied across conductor 34. With switch 28 in the CABLE LENGTH position as shown, voltmeter 31 is in parallel with conductor 34 and monitors the voltage thereacross. By varying D.C. voltage source 21, the voltage across conductor 34 can be set to a value which is decimally related to the cable length, i.e., a value which is related to the cable length by a factor of $10^n$, where $n$ can be any whole number from plus infinity to minus infinity, including zero. Accordingly, if the cable length is ten thousand feet, the voltage across cable 34 might be set to ten volts, thereby equating one millivolt of voltage to one foot of cable length. Switch 28 is then thrown to its DISTANCE TO FAULT position; the voltage reading obtained in this position indicates the distance to the cable fault directly in feet, conductor 33 providing an ohmic path thereto. With the cable length and calibrating voltage as set out hereinabove, that is, ten thousand feet and ten volts, respectively, if the short is located midway in the cable, the voltage reading obtained would be five volts or five thousand millivolts which would indicate that the short is located five thousand feet from end 38. In order to assure high accuracy in the fault measurement, a voltmeter having an input impedance which is very high relative to the impedance of conductor 34 should be chosen. Thus, a negligible amount of current will flow in conductor 33 and the DISTANCE TO FAULT voltage reading obtained at end 36 will be substantially the same as the voltage at the short 32.

Where the cable to be tested has more than one short, such as the cable in FIG. 3 which has two shorts, a variation of the above method is employed. End 42 of conductor 39 is connected to terminal 12 and ends 43 and 44 of conductor 41 are connected to terminals 14 and 13, respectively. With switch 17 in the SHORT position, switch 72 in its OPEN-SHORT, and switch 28 in the CABLE LENGTH position, a voltage decimally related to the cable length is applied to the conductor 41. Since the gage of conductor 41 is known, the current that will flow through conductor 41 with an applied voltage decimally related to the cable length can easily be determined. The actual current obtained as indicated by the reading of a milliameter 22 is then compared to the one-short or no-short value as predetermined above; if the measured value is greater than that value, more than one short is indicated. The reason for this can be seen more clearly by referring to FIGS. 2 and 3. If only one short is present, as in the illustration of FIG. 2, then only one current path will be available; however, if two shorts exist, as in the illustration of FIG. 3, the portions of conductors 39 and 41 located between the two shorts 46 and 47 will be in parallel, thus reducing the effective resistance between ends 43 and 44 and resulting in increased current flow.

If this is the case, then in order to determine the location of the two shorts, the current is set to a value equal to the one-short or no-short value. This then would equate one unit of voltage to one unit of cable length. When switch 28 is thrown to its DISTANCE TO FAULT position, the voltage reading obtained across terminals 42 and 43 indicates the distance to short 46 directly in units of length. To determine the distance to short 47, the test connections to conductors 39 and 41 are reversed and the above procedure repeated, that is, ends 44 and 43 of conductor 41 are connected to terminals 14 and 13, respectively, and end 48 of conductor 39 is connected to terminal 12.

Alternatively, a meter relay or like device, which will give an indication when the current therethrough exceeds a predetermined value can be employed in view of the milliameter 22.

Figure 4:
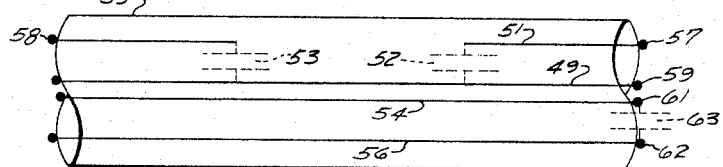
FIG. 4 is an equivalent circuit of a pair of conductors having a break or open in one of the conductors and the means whereby test connections may be made thereto.

In FIG. 4 there is shown a pair of conductors 49 and 51 wherein a break or open exists in one of the conductors, e.g., conductor 51 thereby forming a left-hand segment on the conductor 51 between an end 58 and the brake and a right-hand segment on the conductor 51 between an end 57 and the brake. As shown, the effect of the open can be represented as two capacitances 52 and 53. The magnitude of each capacitance is proportional to the length of cable conductors across which it appears and the sum of the two is proportional to the cable length provided the length of the break is small.

In order to determine whether the break is small or large, use is made of another pair of conductors 54 and 56 located in the cable, no fault existing between the second pair. Preferably, a pair should be chosen so that the capacitance characteristics of the two pairs will be substantially the same. Ends 57 and 58 of conductor 51 are connected together and to terminal 15 of test fixture 11. End 61 of conductor 54 is connected to end 59 of conductor 49 and to terminal 14, and end 62 of conductor 56 is connected to terminal 13. By connecting the ends 57 and 58 of conductor 51 together, the capacitances 52 and 53 are placed in parallel. If the break is small the capacitance of the parallel combination will be equal to the capacitance 63 which appears across conductors 54 and 56, the magnitude of capacitance 63 being proportional to the cable length. Thus when switch 72 is thrown to its PAIR-BREAK position, switch 17 to its OPEN position and switch 28 to its CABLE LENGTH position, and A.C. voltage is thereby applied across capacitance 63 and the parallel combination of capacitances 52 and 53, the magnitude of the voltage read on voltmeter 31 being proportional to the effective length of conductor pairs 49 and 51. After switch 28 is then thrown to its PAIR BREAK position; if the voltage reading obtained is substantially equal to the reading obtained with switch 28 in its CABLE LENGTH position, a small break is indicated; if it is not, a large break is indicated. Obviously, a second reading not equal to the first reading would also indicate multiple breaks or a pair break.

Figure 5:
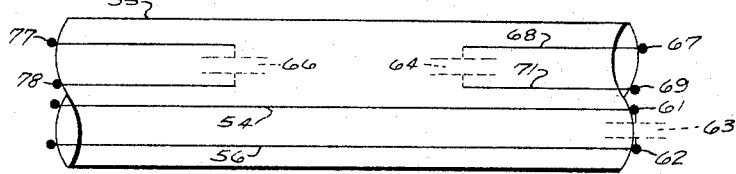
FIG. 5 shows an equivalent circuit of a pair of conductors, each conductor thereof having a break therein and the means whereby test connections may be made thereto.

To locate the open where the break is small, ends 57 and 58 of conductor 51 are connected to terminals 13 and 14 respectively, and end 59 of conductor 49 is connected to terminal 12. When switch 72 is then thrown to its OPEN-SHORT position, and switch 17 is thrown to its OPEN position, an A.C. voltage is applied to conductor 51. With switch 28 in its CABLE LENGTH position, the voltage across conductor 51 is set to a value decimally related to the cable length. When switch 28 is thrown to its DISTANCE TO FAULT position, the voltage reading obtained indicates the distance to the open directly in units of length. Since the voltage across one of two capacitors in series is proportional to the magnitude of the second capacitor, the indicated distance to the fault will be from end 57 rather than from end 58 as would have been the case for the location of shorts.

Where the break in the conductor is large, the location to the ends of the break are determined by treating the conductor pair, as if it has a type of fault known as a "pair break." A conductor pair having a "pair break" is illustrated in FIG. 5. The effects of the breaks are represented by two capacitances 64 and 66. In order to determine the location of the breaks, use is again made of a second pair of conductors 54 and 56, having capacitance characteristics substantially similar to that of the first pair. To locate the break giving rise to capacitance 64, end 67 of conductor 68 is connected to terminal 13, and end 69 of conductor 71 is connected to terminal 14 and to end 61 of conductor 54. End 62 of conductor 56 is connected to terminal 15. As before, capacitance 63 is proportional to the cable length. With switch 72 in its PAIR BREAK position, switch 17 in its OPEN position and switch 28 in its CABLE LENGTH position, an A.C. voltage is applied across the series combination of capacitance 63 and 64. This voltage is varied until voltmeter 31 which is monitoring the voltage across capacitance 64, reads a value of voltage decimally related to the cable length. By so doing, we have equated one unit of voltage to one unit of length. For example, if the cable length is ten thousand feet and the voltage across capacitance 64 is set to ten volts, one millivolt of voltage has been equated to one foot of cable length. Thus, when switch 28 is thrown to its PAIR BREAK position, the reading obtained on voltmeter 31 which is now across capacitance 63, indicates the distance to fault 64 directly in units of length.

In order to locate the distance to the break giving rise to capacitance 66, ends 77 and 78 are connected in the test circuit instead of ends 67 and 69, the fault locating procedure being the same.

Figure 6:
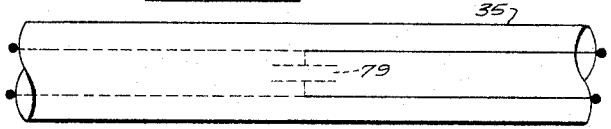
FIG. 6 shows an equivalent circuit of a pair of conductors having a portion thereof missing from the cable.

Another type of fault encountered in cable manufacture is one known as "a pair missing at one end." This is illustrated in FIG. 6. As can be readily seen the location to break 79 can be determined using the same method used to locate the break 64 of FIG. 5.

Figure 7:
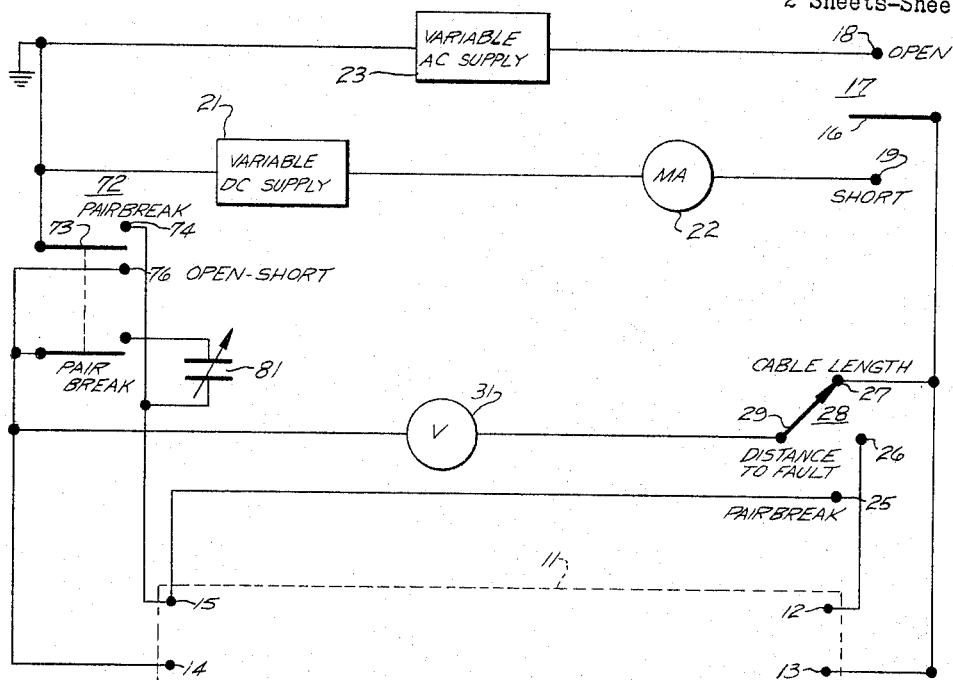
FIG. 7 is a schematic of a modification of the embodiment shown in FIG. 1.

In lieu of utilizing a second pair of conductors in the cable to provide a capacitance proportional to cable length, a capacitor in the test set can be used. A circuit embodying this modification is shown in FIG. 7. The operation of this circuit is essentially the same as that of FIG. 1 except that switch 72 now operates to connect a variable capacitor between terminals 14 and 15 in its PAIR BREAK position.

Thus, for example, in order to determine the location of the break which establishes capacitance 64 of FIG. 5, ends 67 and 69 would be connected to terminals 13 and 14 respectively and switch 72 would be thrown to its PAIR BREAK position. This would place capacitor 81 in series with capacitance 64. Capacitor 81 would then be set to a value proportional to the cable length and the location of the break giving rise to capacitance 64 determined as hereinabove.

Figure 8:
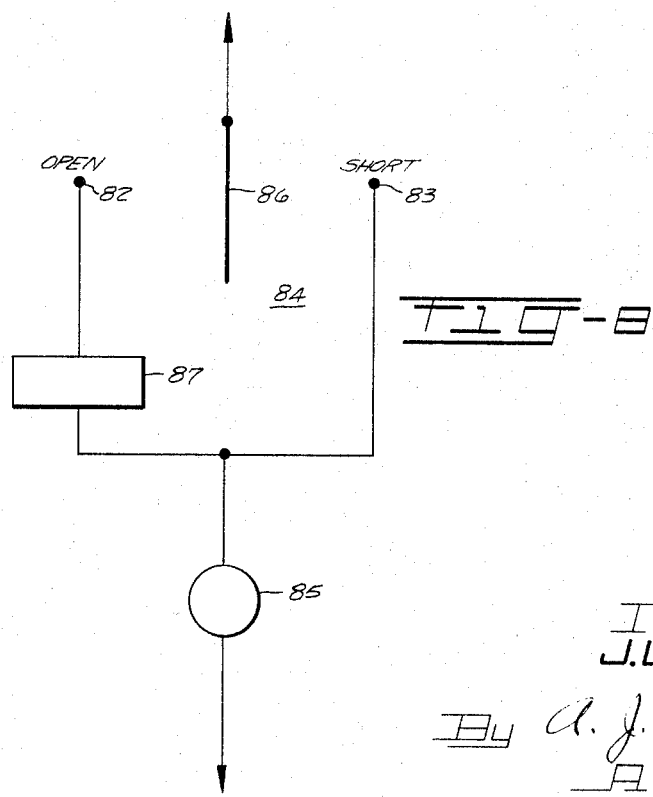
FIG. 8 is a modification which may be used with the circuits of FIG. 1 and FIG. 7.

It has been found that extremely high accuracies can be obtained if the voltmeter 33 is of the digital type. However, it has also been found that the readout of some voltmeters of this type when the voltmeter is used to monitor a changing voltage, lags behind the voltage being measured by a time interval which makes setting of the voltage to a predetermined value a laborious task. Accordingly, in order to facilitate setting of the calibrating voltage, i.e., the voltage decimally related to the cable length, where a digital voltmeter of the type mentioned is employed, a second voltmeter not of the digital type can be used. This modification is shown in FIG. 8. As shown one end of a non-digital D.C. voltmeter 85 is connectable to contact 76 of switch 72, the other end thereof is connected through two parallel branches to the contacts 82 and 83 of switch 84, the branch connected to contact 82 having a rectifier 87 therein. Arm 86 of switch 84 is connectable to arm 29 of switch 28. In the location of opens, switch 84 would be thrown to its OPEN position and a coarse reading of the A.C. calibrating voltage obtained on voltmeter 85, the A.C. voltage being rectified by rectifier 87. The precise value of calibrating voltage would then be set in utilizing the digital voltmeter. The same procedure would be followed in the location of shorts. However, in this case, switch 84 would be thrown to its SHORT position.

In order to expedite the testing even further and to obviate the need for a second voltmeter, decade controlled power supplies may be employed. Accordingly, in operation, the voltage decimally related to cable length would be applied to the cable by merely setting the decades of the power supply to this value.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A method of determining the magnitude of an open fault in one of two associated current carrying conductors of a cable comprising:

connecting the ends of said one conductor of said pair together by a common buss, connecting a capacitance equal in value to the capacitance normally existing between the conductors of said pair when no fault is present, in series with the capacitance of said pair of conductors exhibiting a fault, applying an A.-C. voltage across said two capacitances in series, and measuring the voltage across said first pair of conductors and across said capacitance in series therewith, respectively, a close correspondence between the two measured voltages indicating a small open fault condition, a wide variation between said two measured voltages indicating a correspondingly larger open fault condition.

2. A method as defined in claim 1 wherein said capacitance connected in series with the capacitance of one of said pair of conductors exhibiting an open fault comprises a second pair of conductors in the same cable exhibiting similar electrical characteristics in the absence of a fault.

References Cited by the Examiner

UNITED STATES PATENTS

| 1,084,910 | 1/1914 | Stephenson | 324—52 |
| 2,551,942 | 5/1951 | Greene | 324—52 |
| 3,234,459 | 2/1966 | Brazee | 324—52 |

FOREIGN PATENTS

| 23,492 | 12/1901 | Great Britain. |
| 561,523 | 5/1944 | Great Britain. |

WALTER L. CARLSON, *Primary Examiner.*

G. R. STRECKER, *Assistant Examiner.*